(12) United States Patent
Heinrich

(10) Patent No.: US 7,395,729 B2
(45) Date of Patent: Jul. 8, 2008

(54) POSITION DETECTION OF A SHIFTING DEVICE

(75) Inventor: Kai Heinrich, Bodnegg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 85 days.

(21) Appl. No.: 11/070,341

(22) Filed: Mar. 2, 2005

(65) Prior Publication Data

US 2005/0193847 A1    Sep. 8, 2005

(30) Foreign Application Priority Data

Mar. 3, 2004    (DE) .................. 10 2004 010 271

(51) Int. Cl.
| F16H 59/00 | (2006.01) |
| F16H 59/04 | (2006.01) |
| F16H 61/00 | (2006.01) |
| F16H 63/00 | (2006.01) |
| B60K 17/04 | (2006.01) |
| B60K 17/12 | (2006.01) |
| B60K 20/00 | (2006.01) |

(52) U.S. Cl. ............... 74/335; 74/473.12; 74/473.36
(58) Field of Classification Search ............ 74/335, 74/473.1, 473.12, 89.23, 89.37, 473.36; 318/430–434
See application file for complete search history.

(56) References Cited

U.S. PATENT DOCUMENTS

| 1,994,773 | A | * | 3/1935 | Lapsley ............... 74/333 |
| 2,096,304 | A | * | 10/1937 | Lapsley ............... 74/325 |
| 4,598,238 | A | * | 7/1986 | Scarano ............... 318/282 |
| 4,911,031 | A | * | 3/1990 | Yoshimura et al. ..... 74/335 |
| 5,038,627 | A | * | 8/1991 | Schwaiger et al. ..... 74/335 |
| 5,832,777 | A | | 11/1998 | Weilant |
| 6,335,599 | B1 | * | 1/2002 | Nonaka et al. ........ 318/430 |
| 6,591,704 | B2 | * | 7/2003 | Kamiya et al. ........ 74/335 |
| 6,658,950 | B2 | * | 12/2003 | Yamamoto ........... 74/336 R |
| 6,755,090 | B2 | * | 6/2004 | Ima .................. 74/330 |
| 7,201,074 | B2 | * | 4/2007 | Ima .................. 74/339 |

FOREIGN PATENT DOCUMENTS

| DE | 101 43 324 A1 | 4/2003 |
| EP | 1 022 492 A1 | 7/2000 |

* cited by examiner

*Primary Examiner*—Tisha D Lewis
(74) *Attorney, Agent, or Firm*—Davis Bujold & Daniels, P.L.L.C.

(57) ABSTRACT

A device and a method for determining the position of a gear shift element 1 in a claw clutch operated automated gear box of a vehicle. The gear shift element 1 has gear teeth that correspond to at least two gear wheels 5, 8 which have a different axial extension on both sides of a groove 9. The position of the gear shift element 1 can be determined by way of the method according to the invention.

7 Claims, 1 Drawing Sheet

POSITION DETECTION OF A SHIFTING DEVICE

This application claims priority from German Application Ser. No. 10 2004 010 271.6 filed Mar. 3, 2004.

FIELD OF THE INVENTION

The invention concerns a device as well as a method for detecting the position of a gear shift element in a transmission, in particular in a claw clutch operated automatic gearbox of a vehicle.

BACKGROUND OF THE INVENTION

Electric motors which drive mechanical shifting devices are generally used in known adjusting devices of gear shift elements in claw clutch operated automated gear boxes of vehicles. The mechanical shifting devices usually convert the rotary motion of the electric motor into a translatory motion. The gear shift elements, such as gear shift sleeves, are moved by the mechanical shifting devices. A spindle, for example, can serve as a mechanical shifting device.

A control device is responsible for controlling shifting of the gear shift element.

It is necessary for the control device to know the exact position of the shifting device and, consequently the position of the gear shift element, before shifting the gear shift element.

There are several possibilities for detecting the position of the shifting device. One possibility is to measure the translation of the shifting device absolutely via a travel sensor. However, these sensors are expensive and require a relatively large installation space. A further possibility is to equip the electric motors with known sensors to measure the direction of rotation and the engine speed. In order to enable an exact determination of the position of the shifting device, these are customarily combined with reference sensors. A reference point is selected therein in a first step and the position of the shifting device is calculated based on a movement starting from this reference point. Selection of the reference point is necessary therein, since the memory, in which the position is stored, is usually non-permanent and, in addition, the position of the gear shift element can change due to the vibration of the vehicle.

For this reason, it is the object of the invention to enable a more economical method and device for detecting the position of gear shift elements in claw clutch operated automated gear boxes.

SUMMARY OF THE INVENTION

According to the invention, the device consists of at least one control device, a drive, a mechanical shifting device, a shift fork, a gear shift element, at least two gear wheels, and a sensor, which measures the motion of the mechanical shifting device. The position of the gear shift element is determined without using a reference sensor. The drive, which moves the mechanical shifting device of the gear shift element, is controlled for this purpose in such a way by the control device that the position of the gear shift element can be determined from the resulting motion of the shifting device.

The drive is advantageously an electric motor, which is connected via at least one line to the control device. The amount of current flowing through the motor can be measured via this line. The specification of the direction of rotation of the motor by the control device is additionally possible via this line.

The mechanical shifting device is advantageously a device that converts a rotary motion of the electric motor into a translatory motion of the gear shift element. This is possible, for example, by way of a spindle, a worm gear, a gear rod, a crank gear, an eccentric or also a Bowden cable. The gear shift element is mechanically connected via a shift fork to the mechanical shifting device on which a transmitter wheel, having discontinuities distributed over the periphery, is arranged fixed against rotation. An incremental sensor can be used in order to be able to determine the movement of the spindle. A signal based on the motion of the transmitter wheel is generated in this sensor. This signal is forwarded to the control device. A number of impulses can be allocated; a number of rotations of the mechanical shifting device according to the spacing of the discontinuities of the transmitter wheel distributed over the periphery. The control device can calculate therefrom, for example, the axial adjusting travel of the gear shift element while taking into consideration the spindle pitch and using the sum of the impulses.

The gear shift element is advantageously a gear shift sleeve. It is mounted between two gear wheels and has gear teeth that correspond to the gear wheels. The gear shift sleeve has a radial groove for accommodating a shift fork, which is mechanically connected to the mechanical shifting device. The gear teeth have a different axial extension on both sides of the groove according to the invention, as do the corresponding teeth of the gear wheels. The maximum adjusting travel for engaging the gear shift sleeve is thus different in the two different gear wheels.

The position of the gear shift sleeve can be precisely determined by way of a method, according to the invention based on this embodiment, without having to select a reference point.

The electric motor is selected for this purpose by the control device in such a way that the gear shift element moves in the direction of the first gear wheel. The gear teeth of the gear shift element can come into contact with the teeth of the corresponding gear wheel in such a way that it can or cannot engage the gear wheel. This is referred to below with the terms "shifting through" for a possible engagement or "tooth on tooth" for a prevented engagement. If the gear shift element has arrived at one of the described end positions, the current in the drive increases depending on the design. If then a limit value of the current has been reached at an end position, a counter is set to the value "zero" in the control device. Thereafter, the control device controls the motor in such a way that the shifting device moves the gear shift element in the direction of the second gear wheel until the gear shift element arrives again at an end position and the current has increased up to a limit value. The axial adjusting travel is now dependent upon whether the case "shifting through" or "tooth on tooth" applies when the first or second final position is reached. A precise position at the end of the adjusting process can be determined because the gear teeth of the gear shift element have a different axial extension on both sides.

BRIEF DESCRIPTION OF THE DRAWING

The invention will now be described, by way of example, with reference to the accompanying drawings in which.

DETAILED DESCRIPTION OF THE INVENTION

Figure 1:
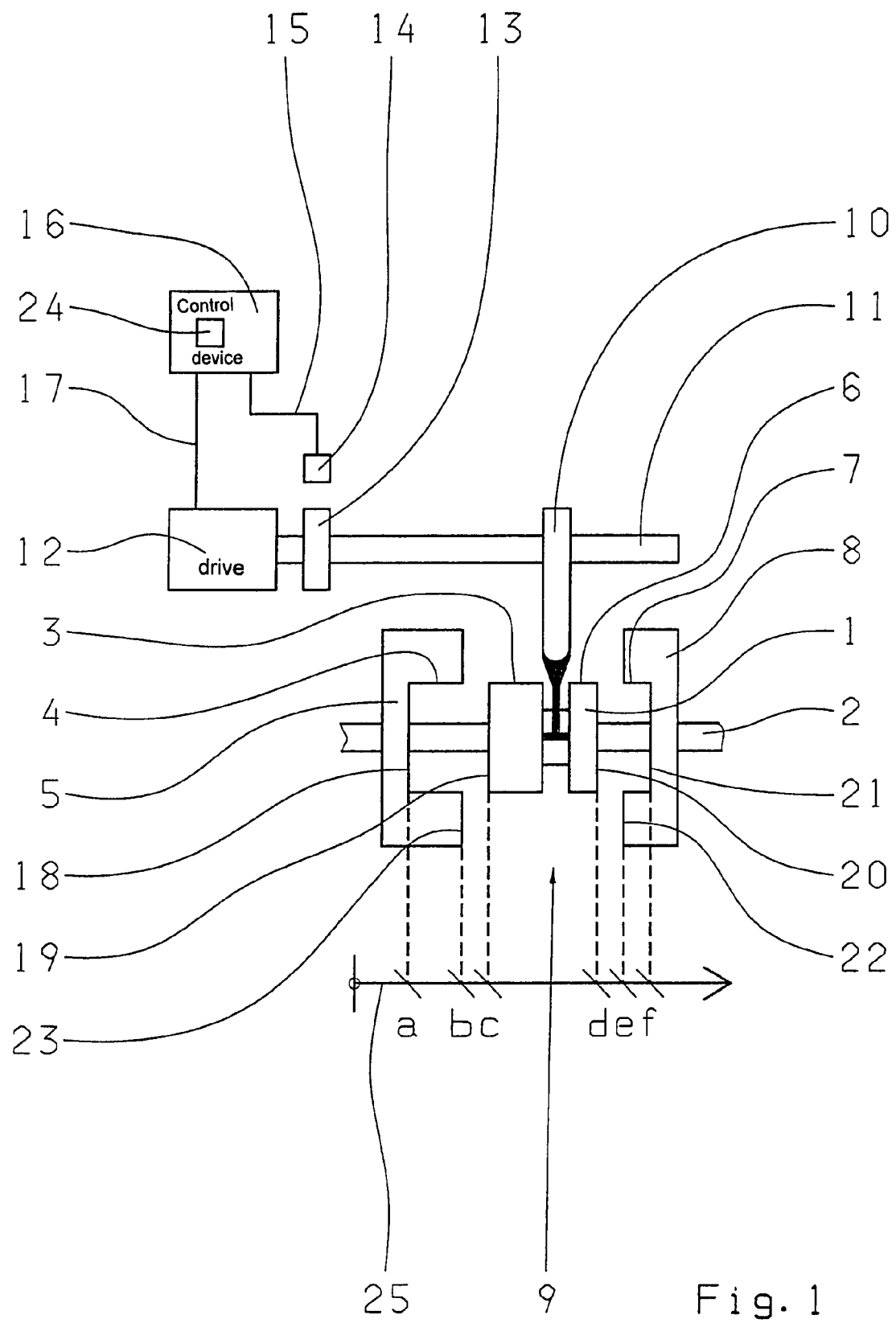
FIG. 1 shows a schematic representation of an device for determining the position of a gear shift element according to the invention.

The sole Figure shows a gear shift element 1, which is axially displaceably mounted on an axle 2. The gear shift element 1 has gear teeth on a surface 3 that correspond to a surface 4 of a first gear wheel 5. In addition, the gear shift element 1 has gear teeth on a surface 6 that correspond to a surface 7 of a second gear wheel 8. The gear shift element 1 has a cavity 9 that can accommodate a shift fork 10. The shift fork 10 is mounted advantageously on a spindle 11, which is driven by an electric motor 12. A transmitter wheel 13 is also mounted against rotation on the spindle 11, which generates signals in a sensor 14. The sensor 14 has a signal line 15 to a control device 16. The electric motor 12 has a line 17 to the control device 16. The control device 16 has at least one incremental counter 24, which counts the impulses originating from the sensor 14. The gear shift element 1 has a surface 19 on the side facing the first gear wheel 5, and a surface 20 on the side facing the second gear wheel 8. The first gear wheel 5 has a surface 18 at the inner end of the gear teeth and a surface 23 at the outer end of the gear teeth. The second gear wheel 8 has a surface 21 at the inner end of the gear teeth and a surface 22 at the outer end of the gear teeth.

On a bar 25, the points are marked corresponding to the characteristic positions of the gear wheels 5, 8 or the gear shift element 1. With the aid of the points, the axial adjusting path of the gear shift element can be calculated. Therein, the following describe:

a: end of the gear teeth of the gear wheel 5,
b: start of the gear teeth of the gear wheel 5,
c: start of the gear teeth of the gear shift element in the direction of the gear wheel 5,
d: start of the gear teeth of the gear shift element in the direction toward the gear wheel 8,
e: start of the gear teeth of the gear wheel 8, and
f: end of the gear teeth of the gear wheel 8. The method for determining the position of the gear shift element 1, according to the invention, progresses according to the following steps. The start of the position determination can be triggered either by starting the drive of the motor vehicle or by a detection of the disengagement of the separating clutch of the gear box of the vehicle corresponding to the gear shift element 1. Basically, the power flow between the gear shift element 1 and the gear wheels 5, 8 must be interrupted. Thereupon a first engagement attempt of the gear shift element 1 into the first gear wheel 5 is made until the current of the electric motor 12 increases due to locking. In a possible shifting through operation, the motor 12 locks as soon as the surface 19 of the gear shift element 1 meets with the surface 18 of the gear wheel 5. In the case of "tooth on tooth," the motor 12 locks if the teeth of the corresponding gear tooth systems of the gear shift element 1 and the gear wheel 5 meet each other and further engagement is not possible. In this case, the surfaces 19 and 23 rest against each other.

As soon as the current of the motor 12 increases to a limit value, the control device 16 detects this via the line 17. The counter 24, preferably an incremental counter in the control device 16, is set to the value zero. In the further movement of the shifting device 11, the impulses received from the sensor 14 are transmitted to the control device 16 and added in the incremental counter 24. The drive 12 is then selected by the control device 16 in such a way that it moves the gear shift element 1 via the mechanical shifting device 11 in the direction of the second gear wheel 8 until the current in the motor 12 increases again to a limit value way a locking of the motor 12. Here either the "shifting through" or the "tooth on tooth" cases are possible as well. The counted increments are now compared to fixed stored values and the position of the gear shift element 1 in the control device 16 is determined therewith. The impulses received via the sensor 14 can be converted into the rotary motion of the motor 12. Eighteen impulses, for example, can correspond to one rotation. The linear movement and the position of the gear shift element can be determined via the spindle pitch from the number of impulses.

The possible results are shown in the following table. In the first case, the gear shift element 1 moves first by the distance (c-a) toward the left. The motor 12 is prevented from moving further and the incremental counter 24 is set to the value zero. The gear shift element 1 moves by the distances (c-a) and (f-d) toward the right. The cases 2-4 can be interpreted accordingly.

| | Completed Shifting Operation | Measured Distance | Position of Gear shift element |
|---|---|---|---|
| 1st | Shifting through in gear wheel 5 and 8 | (c − a) + (f − d) | Surface 20 on surface 21 |
| 2nd | Tooth on tooth in gear wheel 5, shifting through in gear wheel 8 | (c − b) + (f − d) | Surface 20 on surface 21 |
| 3rd | shifting through in gear wheel 5, tooth on tooth in gear wheel 8 | (c − a) + (e − d) | Surface 20 on surface 22 |
| 4th | Tooth on tooth in gear wheel 5 and 8 | (c − b) + (e − d) | Surface 20 on surface 22 |

| Reference Numerals | |
|---|---|
| 1 | gear shift element |
| 2 | axle |
| 3 | surface |
| 4 | surface |
| 5 | gear wheel |
| 6 | surface |
| 7 | surface |
| 8 | gear wheel |
| 9 | cavity |
| 10 | shift fork |
| 11 | shifting device |
| 12 | drive |
| 13 | transmitter wheel |
| 14 | sensor |
| 15 | signal line |
| 16 | control device |
| 17 | line |
| 18 | surface |
| 19 | surface |
| 20 | surface |
| 21 | surface |
| 22 | surface |
| 23 | surface |
| 24 | incremental counter |
| 25 | bar |

The invention claimed is:

1. A device for determining a position of a gear shift element (1) of a claw clutch controlled automated gear box of a vehicle, the device having:
   at least two gear wheels (5, 8),
   a shlft fork (10),
   a mechanical shifting device (11),
   at least one sensor (14),
   a drive (12), and
   a control device (16) which is connected to the at least to one sensor (14) via a signal line (15),
   the gear shift element (1) having at least one radial groove (9) in which the shift fork (10) engages, the gear shift element (1) being axially displaced by the mechanical shifting device (11), the gear shift element (1) and the at least two gear wheels (5, 8) each have corresponding gear teeth,
   wherein the gear teeth of the gear shift element (1) have different axial widths from one another and the corresponding gear teeth of the at least two gear wheels (5, 8) have different axial widths from one another such that the gear shift element (1) must travel a greater distance to completely engage one of the two gear wheels (5, 8) then the gear shift element (1) travels to completely engage the other of the two gear wheels (5, 8), and the position of the gear shift element is determined by determining, independently of a reference point and by operation of a distance sensor (14) connected to the control device (16), a distance traveled by the gear shift element (1) to engage one of the two gear wheels (5, 8) and the distance traveled indicates the position of the gear shift element (1).

2. The device according to claim 1, wherein the drive (12) is an electric which is connected, via a line (17), to the control device (16).

3. The device according to claim 1, wherein the mechanical shifting device (11) is a worm gear or a which is rotated by the drive (12) and displaces the shift fork (10) in an axial direction.

4. The device according to claim 1, wherein a transmitter wheel (13), which generates a signal in the sensor (14), is mounted on the mechanical shifting device (11) and the sensor (14) is an incremental sensor.

5. A method of determining a position of a gear shift element (1) in an automated gearbox of a vehicle having an in which a sensor (14) measures movement of a mechanical shifting device (11) by way of a drive (12) and sends a corresponding signal to at least one control device (16), the method comprising the steps of:
   controlling the drive (12), via the control device (16), in such a way that the mechanical shifting device (11) moves the gear shift element (1), via a shift fork (10), first in a direction of a first gear wheel (5) until further movement is prevented and a measured current of the drive (12) reaches a limit value,
   a counter (24) of sensor signals in the control device (16) to a value zero,
   controlling the drive (12) in such a way that the mechanical shifting element (11) moves gear shift element (1) in a direction of a second gear wheel (8) until movement is prevented and the measured current of the drive (12) reaches again a limit value,
   comparing a sum of the measured sensor signals measured in the control device (16) to fixed values at a transmitter wheel (13), and
   determining the position of the gear shift element (1) upon conformity of a sum with one of the fixed values.

6. The method according to claim 5, further comprising the step of commencing the method after starting drive motor of the vehicle.

7. The method according to claim 5, further comprising the step of commencing the method only upon detection of disengagement of a separating clutch.

* * * * *